No. 834,857. PATENTED OCT. 30, 1906.
T. H. WORRALL.
CLUTCH.
APPLICATION FILED NOV. 9, 1905.
2 SHEETS—SHEET 2.
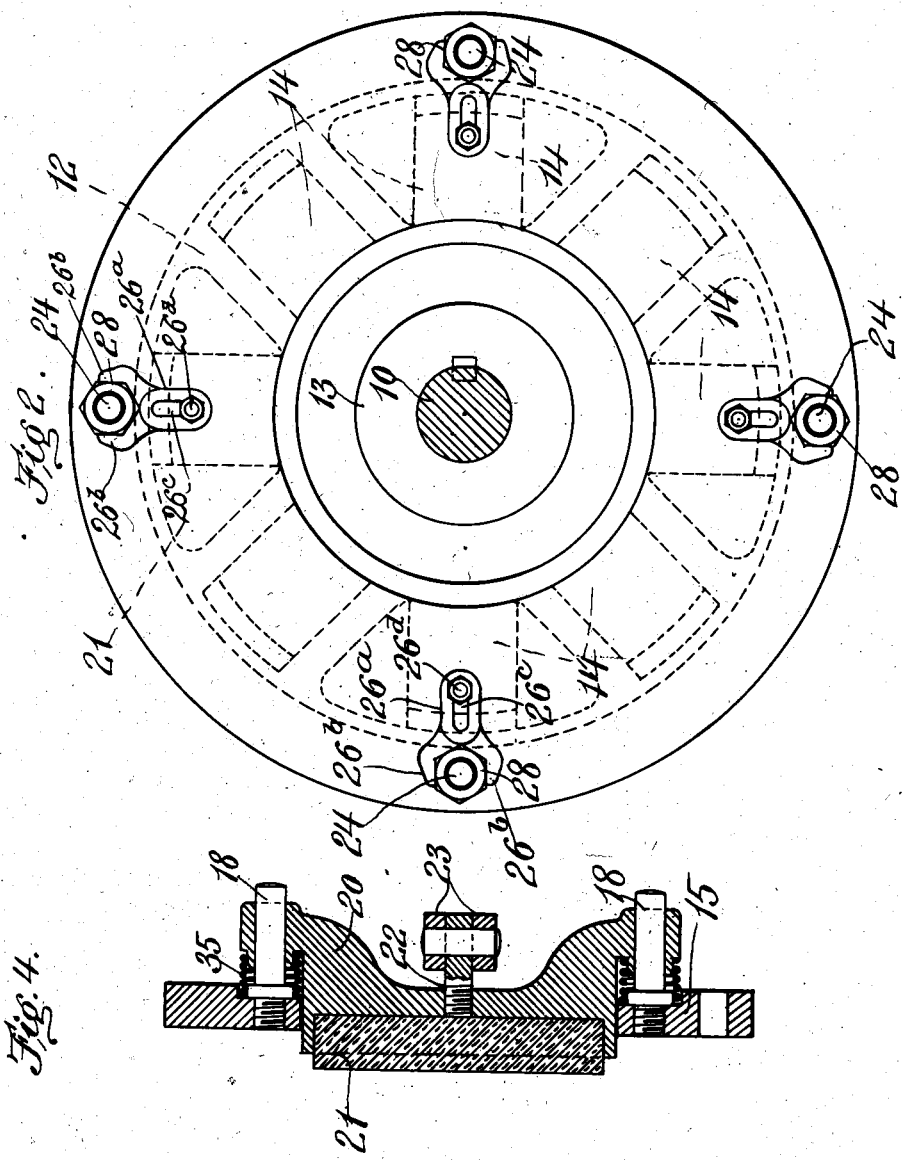
Witnesses.
L. E. Kennedy
E. Batchelder
Inventor.
Thomas H. Worrall
by Wright Brown Quimby & May
Atty's.

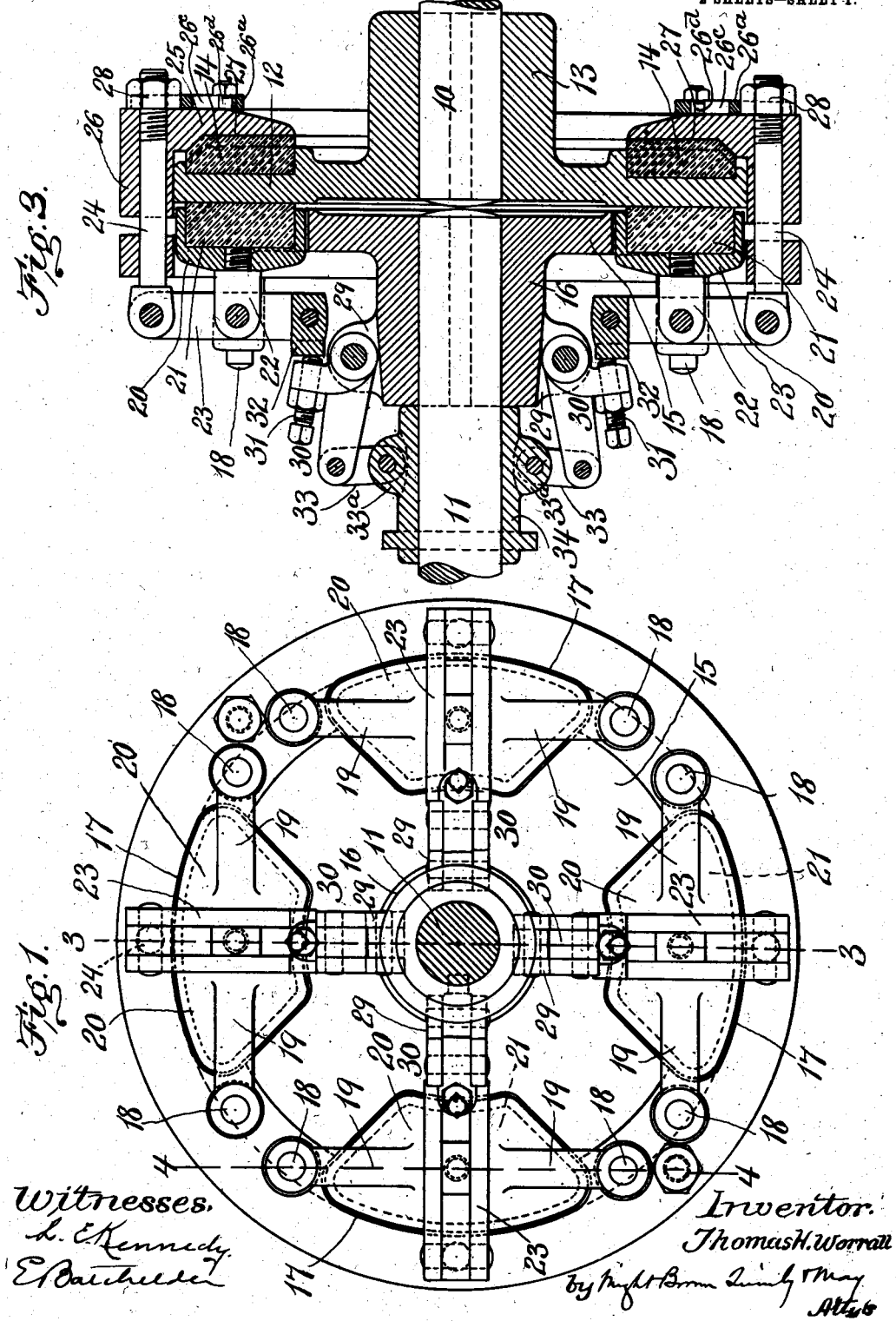

UNITED STATES PATENT OFFICE.

THOMAS H. WORRALL, OF LACONIA, NEW HAMPSHIRE.

CLUTCH.

No. 834,857.      Specification of Letters Patent.      Patented Oct. 30, 1906.

Application filed November 9, 1905. Serial No. 286,449.

*To all whom it may concern:*

Be it known that I, THOMAS H. WORRALL, of Laconia, in the county of Belknap and State of New Hampshire, have invented certain new and useful Improvements in Clutches, of which the following is a specification.

This invention relates to clutch mechanism, and more particularly that of the friction type.

It consists of the various features and combinations hereinafter described and claimed.

In the accompanying drawings, in which similar characters designate like parts throughout the several views, Figure 1 is a side elevation of one embodiment of my invention. Fig. 2 is a similar view of the opposite side. Fig. 3 is a vertical section on the line 3 3 of Fig. 1, and Fig. 4 is a horizontal sectional detail through the pressure-applying disk on the line 4 4 of Fig. 1.

In the present embodiment of my invention I have illustrated my improved clutch applied as a cut-off coupling between alined shafts 10 and 11, the former of which may be the driving element. Upon the shaft 10 is mounted a pressure-receiving disk 12, having a hub 13, by which the disk may be secured to the shaft. About the outer face of this disk or that on the side from which the hub projects is a circular series of recesses to receive friction-blocks 14, which may be of wood, fiber, metal, or any other convenient material. Fast upon the shaft 11 is a pressure-applying disk 15, having a hub 16. Through the disk 15 are openings 17, here shown as four in number and being circularly arranged. These openings are preferably generally sector-shaped and may be located equidistantly from one another. From the outer face of the disk 15, at each side of the openings 17, extend studs or projections 18, adapted to receive arms 19 from contact members 20, which extend into the disk-openings and preferably have secured in recesses separable friction-blocks 21, similar to those carried by the pressure-receiving disk. From the outer surface of each of the contact members 20 extends a stud or projection 22, upon which is fulcrumed a lever 23, connected by a rod 24 to a contact member situated upon the opposite side of the pressure-receiving member. This contact member is shown as in the form of a ring 25, having a flange 26 bearing upon the edge of the disk 12. The ring 25 has a face 27 for contact with the friction members 14. The rods 24 are preferably threaded at the ends opposite their connection with the levers 23 to receive nuts 28, allowing the distance between the contact members to be adjusted. With these nuts may coöperate retaining and gage members, which, as illustrated, each consist of a bar 26$^a$, having separated jaws 26$^b$ 26$^b$ spaced from one another to contact with the faces of the nut at opposite sides. Through the inner portion of each retaining member is a substantially radial slot 26$^c$, through which a screw 26$^d$ extends and is threaded into the ring 25. The length of the slot is preferably such that the retaining member may move into and out of coöperation with the associated nut without removing the screw 26$^d$.

From the hub of the disk 15 project pairs of lugs 29, corresponding in number to the levers 23. These have fulcrumed between them angle-levers 30, through the radially-extending arms of which are threaded screws 31 for contact with blocks 32 upon the inner extremities of the levers 23. By positioning these screws the relation between the two levers may be varied to control the application of the clutch. The outer arm of each of the angle-levers is joined by a link 33 to lugs 33$^a$ upon an operating-collar 34, movable along the shaft 11.

When the operating member and lever system is in the position most clearly shown in Fig. 3 of the drawings, the friction-blocks of the contact members 20 will be forced against the inner side of the pressure-receiving disk, while the face of the contact-ring will be drawn against the friction-blocks upon the opposite side, these opposite members thus clutching the disk between them to compel the parts to rotate together. When the operating-collar is moved outwardly, the pressure of the screws 31 against the levers 23 is relaxed. The two sets of contact members are then positively moved out of engagement with the disk 12 by springs 35, which are shown as surrounding the studs 18 abutting against the disk 15 and the arms of the members 20 and exerting their tension to move the latter outwardly from the disk 12, this at the same time effecting an opposite movement of the contact-ring. As the contacting surfaces of the clutch wear this may be taken up by loosening the screws 26$^d$ and slipping back the retaining members until the nuts 28 may be turned. These are then rotated through the same angle and reëngaged by the retaining members, which by their coaction with the nut-faces occupying fixed angles with relation to one another gage and maintain the adjustment. Thus a uniform engagement about the entire circumference is insured. It will be obvious that, if desired, this clutch mechanism may be applied in other connections, as to a friction-pulley, in the manner common in mechanism of this class.

Having thus described my invention, I claim—

1. The combination with a clutch member, of a companion clutch member provided with an opening, and a contact member movable through the opening into coöperation with the first-named clutch member.

2. A clutch comprising a pressure-receiving disk, a pressure-applying disk provided with an opening, a contact member mounted near the periphery of the disk and extending upon opposite sides of the pressure-receiving disk, and a contact member movable through the disk-opening.

3. A clutch comprising a pressure-receiving disk, a pressure-applying disk, provided with an opening, contact members mounted upon the pressure-applying disk upon opposite sides of the pressure-receiving disk, one of said members being movable through said opening, and means carried by the pressure-applying disk for moving the contact members toward and from one another.

4. A clutch comprising a pressure-receiving disk, a pressure-applying disk, provided with an opening, contact members mounted upon the pressure-applying disk upon opposite sides of the pressure-receiving disk, one of said members being movable through said opening, and a lever carried by one of the contact members and being connected with the other.

5. A clutch comprising a pressure-receiving disk, a pressure-applying disk, provided with an opening, contact members mounted upon the pressure-applying disk upon opposite sides of the pressure-receiving disk, one of said members being movable through said opening, a lever carried by one of the contact members, and adjustable means for connecting said lever and the other contact member.

6. A clutch comprising a pressure-receiving disk, a pressure-applying disk, provided with an opening, contact members mounted upon the pressure-applying disk upon opposite sides of the pressure-receiving disk, one of said members being movable through said opening, a lever carried by one of the contact members and being connected with the other, and a spring situated between a contact member and the pressure-applying disk.

7. A clutch comprising a pressure-receiving disk, a pressure-applying disk, provided with an opening, contact members mounted upon the pressure-applying disk upon opposite sides of the pressure-receiving disk, one of said members being movable through said opening, a lever carried by one of the contact members and being connected with the other, and a lever fulcrumed upon the pressure-applying disk and coöperating with the contact member.

8. A clutch comprising a pressure-receiving disk, a pressure-applying disk, provided with an opening, contact members mounted upon the pressure-applying disk upon opposite sides of the pressure-receiving disk, one of said members being movable through said opening, a lever carried by one of the contact members and being connected with the other, a lever fulcrumed upon the pressure-applying disk and coöperating with the contact member, and adjustable means for connecting the levers.

9. A clutch comprising a pressure-receiving disk, a pressure-applying disk having an opening, a contact member movable through the opening, a contact member situated upon the opposite side of the pressure-receiving disk, and a lever system connecting the contact members.

10. A clutch comprising a pressure-receiving disk, a pressure-applying disk having an opening, a contact member movable through the opening, a contact member situated upon the opposite side of the pressure-receiving disk, and a lever system connecting the contact members and the pressure-applying disk.

In testimony whereof I have affixed my signature in presence of two witnesses.

THOMAS H. WORRALL.

Witnesses:
 GEO. P. MUNSEY,
 O. J. GEORGE.